(12) United States Patent
Ma et al.

(10) Patent No.: US 11,429,184 B2
(45) Date of Patent: Aug. 30, 2022

(54) VIRTUAL REALITY DISPLAY DEVICE, DISPLAY DEVICE, AND CALCULATION METHOD OF LINE-OF-SIGHT ANGLE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Zhanshan Ma, Beijing (CN); Wenhong Tian, Beijing (CN); Chenru Wang, Beijing (CN); Hao Zhang, Beijing (CN); Haoran Jing, Beijing (CN); Zhiyu Sun, Beijing (CN); Chao Zheng, Beijing (CN); Bin Zhao, Beijing (CN); Zheng Ge, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 335 days.

(21) Appl. No.: 16/498,687

(22) PCT Filed: Apr. 1, 2019

(86) PCT No.: PCT/CN2019/080858
§ 371 (c)(1),
(2) Date: Sep. 27, 2019

(87) PCT Pub. No.: WO2019/196694
PCT Pub. Date: Oct. 17, 2019

(65) Prior Publication Data
US 2021/0365111 A1  Nov. 25, 2021

(30) Foreign Application Priority Data

Apr. 13, 2018 (CN) .......................... 201810330864.8

(51) Int. Cl.
*G06F 3/01* (2006.01)
*G02B 27/00* (2006.01)
(Continued)

(52) U.S. Cl.
CPC ......... *G06F 3/013* (2013.01); *G02B 27/0093* (2013.01); *G06T 7/70* (2017.01);
(Continued)

(58) Field of Classification Search
None
See application file for complete search history.

(56) References Cited

U.S. PATENT DOCUMENTS 10,247,813 B2  4/2019 Huang et al.
2005/0167590 A1  8/2005 Miyano et al.
(Continued)

FOREIGN PATENT DOCUMENTS

CN  101840089 A  9/2010
CN  101945612 A  1/2011
(Continued)

OTHER PUBLICATIONS

Chinese Office Action dated May 29, 2019.
Third Chinese Office Action from Chinese Patent Application No. 201810330864.8 dated Dec. 2, 2020.

*Primary Examiner* — Talha M Nawaz
(74) *Attorney, Agent, or Firm* — Dilworth & Barrese, LLP.; Michael J. Musella, Esq.

(57) ABSTRACT

A virtual reality display device, a display device, and a calculation method of a line-of-sight angle are provided. The virtual reality display device includes: a display screen configured to display a picture to a user, at least one infrared light source, and an infrared camera; and the infrared camera is on a side of the display screen away from an eye of the user, and is configured to acquire an eye image of the eye of the user that is illuminated by the at least one infrared light source.

17 Claims, 5 Drawing Sheets

(51) Int. Cl.
*H04N 5/225* (2006.01)
*G06T 7/70* (2017.01)
*G02B 3/00* (2006.01)

(52) U.S. Cl.
CPC ......... *H04N 5/2256* (2013.01); *H04N 5/2257* (2013.01); *G02B 3/0006* (2013.01); *G06T 2207/10048* (2013.01); *G06T 2207/30201* (2013.01)

(56) References Cited

U.S. PATENT DOCUMENTS

| | | | |
|---|---|---|---|
| 2018/0053051 A1* | 2/2018 | Chen | G06V 40/19 |
| 2018/0136486 A1* | 5/2018 | Macnamara | G02C 11/10 |
| 2020/0167563 A1* | 5/2020 | Chen | G02B 27/0176 |
| 2020/0218348 A1* | 7/2020 | Eash | G02B 5/208 |

FOREIGN PATENT DOCUMENTS

| | | |
|---|---|---|
| CN | 103557859 A | 2/2014 |
| CN | 204836343 A | 12/2015 |
| CN | 105955491 A | 9/2016 |
| CN | 106372569 A | 2/2017 |
| CN | 106680996 A | 5/2017 |
| CN | 107831593 A | 3/2018 |
| CN | 108519824 A | 9/2018 |

* cited by examiner

VIRTUAL REALITY DISPLAY DEVICE, DISPLAY DEVICE, AND CALCULATION METHOD OF LINE-OF-SIGHT ANGLE

The present application claims priority of Chinese Patent Application No. 201810330864.8, filed on Apr. 13, 2018, the disclosure of which is incorporated herein by reference in its entirety as part of the present application.

TECHNICAL FIELD

Embodiments of the present disclosure relate to a virtual reality display device, a display device, and a calculation method of a line-of-sight angle.

BACKGROUND

Virtual reality (VR) technology is a kind of virtual environment generated by adopting a method which uses computer technology as the core and relies on graphics and image processing, and has immersion and imagination as basic characteristics, thereby obtaining the same feeling as the real world by simulating human vision, hearing, touch, and the like.

SUMMARY

At least one embodiment of the present disclosure provides a virtual reality display device, which comprises: a display screen configured to display a picture to a user, at least one infrared light source, and an infrared camera, and the infrared camera is on a side of the display screen away from an eye of the user, and is configured to acquire an eye image of the eye of the user that is illuminated by the at least one infrared light source.

For example, the virtual reality display device provided by an embodiment of the present disclosure further comprises a support plate on the side of the display screen away from the eye of the user, and the infrared camera is fixed to the support plate.

For example, in the virtual reality display device provided by an embodiment of the present disclosure, the support plate comprises a central hollow opening, and the infrared camera is in the central hollow opening.

For example, the virtual reality display device provided by an embodiment of the present disclosure further comprises at least one visible light source fixed to a side of the support plate close to the display screen, and the at least one visible light source is configured to provide backlight to the display screen.

For example, in the virtual reality display device provided by an embodiment of the present disclosure, the at least one visible light source is arranged in an array on the support plate.

For example, the virtual reality display device provided by an embodiment of the present disclosure further comprises at least one visible light source located on an edge of a surface on a side of the display screen close to the support plate, and the at least one visible light source is configured to provide backlight to the display screen.

For example, the virtual reality display device provided by an embodiment of the present disclosure further comprises a transflective film, the transflective film is between the at least one visible light source and the support plate, and the transflective film is configured to transmit infrared light and reflect visible light.

For example, in the virtual reality display device provided by an embodiment of the present disclosure, the transflective film is on a surface on a side of the support plate close to the display screen.

For example, in the virtual reality display device provided by an embodiment of the present disclosure, the at least one infrared light source is on a side of the support plate close to the display screen.

For example, in the virtual reality display device provided by an embodiment of the present disclosure, a count of the at least one infrared light source is four, and the at least one infrared light source is distributed around the infrared camera.

For example, in the virtual reality display device provided by an embodiment of the present disclosure, the at least one infrared light source is evenly distributed around the infrared camera.

For example, in the virtual reality display device provided by an embodiment of the present disclosure, the display screen has a plurality of symmetry axes, and the infrared camera is, on the support plate, at a position which overlaps with an intersection of the plurality of symmetry axes.

For example, the virtual reality display device provided by an embodiment of the present disclosure further comprises a lens tube, and the display screen is at an end of the lens tube away from the eye of the user.

For example, in the virtual reality display device provided by an embodiment of the present disclosure, an end of the lens tube close to the eye of the user is provided with the at least one infrared light source.

For example, in the virtual reality display device provided by an embodiment of the present disclosure, the display screen is capable of transmitting infrared light emitted by the at least one infrared light source.

For example, the virtual reality display device provided by an embodiment of the present disclosure further comprises a lens, and the lens is at an end of the lens tube close to the eye of the user, and is configured to image the picture displayed by the display screen.

For example, in the virtual reality display device provided by an embodiment of the present disclosure, the lens comprises a micro-lens array.

At least one embodiment of the present disclosure further provides a calculation method of a line-of-sight angle, which comprises: acquiring, by the virtual reality display device according to any one of the embodiments of the present disclosure, the eye image of the eye of the user that is illuminated by the at least one infrared light source; processing the eye image to obtain a pupil position on the eye image; and calculating the line-of-sight angle of the user according to the pupil position.

At least one embodiment of the present disclosure further provides a display device, which comprises the virtual reality display device according to any one of the embodiments of the present disclosure.

For example, the display device provided by an embodiment of the present disclosure further comprises a processor and a memory, the memory comprises one or more computer program modules, the one or more computer program modules are stored in the memory and configured to be executed by the processor, and the one or more computer program modules are executed by the processor to perform: acquiring, by the virtual reality display device, the eye image of the eye of the user that is illuminated by the at least one infrared light source; processing the eye image to obtain a pupil position on the eye image; and calculating a line-of-sight angle of the user according to the pupil position.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
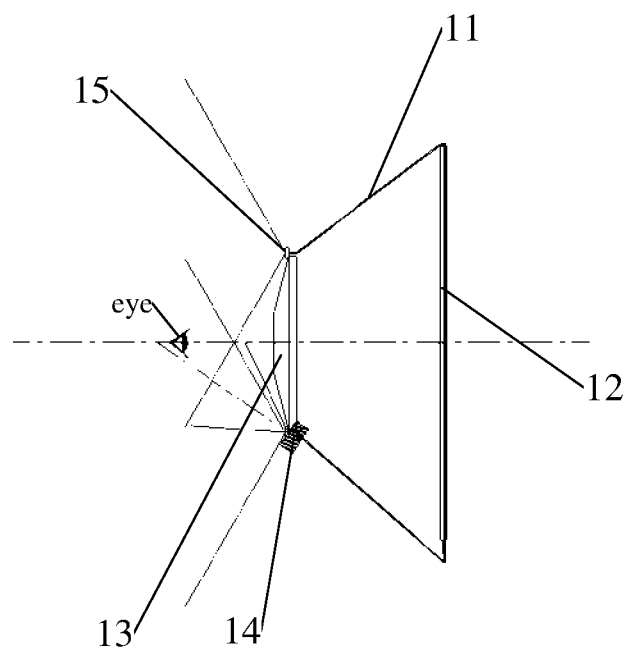
FIG. 1 is a schematic diagram of a virtual reality display device.

In order to clearly illustrate the present disclosure, the present disclosure will be further described below in conjunction with the embodiments and the accompanying drawings. Similar components in the drawings are denoted by the same reference numerals. Those skilled in the art should understand that, the detail description below is illustrative and not limiting, and should not be construed as limiting the protective scope of the present disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Currently, a VR device typically has an eye tracking function. For example, an infrared camera is disposed on a side of the VR device close to the user to directly or indirectly capture an image of an eye of the user, thereby obtaining a pupil position. However, in order not to affect the user's line-of-sight, the position of the infrared camera needs to be away from the user's line-of-sight. Therefore, the requirements for the viewing angle and size of the infrared camera are relatively high, the cost is high, and the image quality is poor. FIG. 1 is a schematic diagram of a virtual reality display device. As illustrated in FIG. 1, a virtual reality display device comprises a lens tube 11, a lens 13, and a display screen 12, and the lens 13 and the display screen 12 are respectively on different sides of the lens tube 11. A picture displayed on the display screen 12 is imaged in the eye of the user through the lens 13, so that the user can view the content displayed on the display screen 12.

In order to achieve the eye tracking function of the display device, an infrared light source 15 and an infrared camera 14 are disposed on a side of the lens tube 11 close to the eye of the user. In order to prevent the user from seeing the infrared camera 14 while viewing the display screen 12 and to avoid affecting the user's visual experience, the infrared camera 14 is usually disposed in an edge region of a center of the line-of-sight of the lens tube 11, and the size of the infrared camera 14 is required to be small, so as to prevent the user from seeing the infrared camera 14 and avoid reducing the visual experience.

However, the infrared camera 14 is disposed in such a manner in which the infrared camera 14 is biased toward the side of the eye of the user, and the requirement for the viewing angle of the infrared camera 14 is relatively high, which may cause that the pupil cannot be photographed at some user's line-of-sight angles, thereby causing a blind spot of the viewing angle. Meanwhile, due to the problem of the shooting angle, it is easy to cause poor quality of the captured infrared image, and the image distortion is severe, resulting in low eye tracking accuracy. For example, the infrared camera 14 illustrated in FIG. 1 is located below the eye, and in a case where the user's line-of-sight rotates away from the infrared camera 14 (e.g., turning upward), it may cause that the infrared camera 14 cannot take a picture which includes the pupil of the user, thereby failing to achieve the eye tracking function. In the field of VR, there are also some VR devices that extend the optical path by providing a structure such as a reflecting plate, thereby reducing the angle between the infrared camera 14 and the visual axis of the user. However, setting the reflecting plat leads to an increase in the cost of the device, the requirement for the precision of the structural assembly is high, and the process is complicated. In addition, because the infrared camera 14 is disposed at an end close to the eye of the user, in a case where the display device is connected to a processor to perform image processing, the distance between the infrared camera 14 and the processor is relatively long, and the image captured by the infrared camera 14 has a large attenuation in signal during long-distance transmission, which easily leads to inaccuracy in the image processing process, thereby reducing the accuracy of the eye tracking.

An embodiment of the present disclosure provides a virtual reality display device, the infrared camera and the infrared light source are disposed on a side of the VR device away from the user, so as not to affect the field of vision of the user and to reduce the requirement for the infrared camera, thereby reducing the cost and improving the imaging quality when shooting the user's eye, and furthermore improving the accuracy of the eye tracking. An embodiment of the present disclosure further provides a calculation method of a line-of-sight angle and a display device comprising the virtual reality display device.

In the virtual reality display device provided by the embodiments of the present disclosure, the infrared camera is provided on the back side of the display screen away from the eye of the user, and the infrared camera does not block the line-of-sight of the user when the user watches the image on the display screen, so that the infrared camera can be disposed in an area where it is convenient for capturing the image of the eye of the user, thereby reducing the requirements for the viewing angle and the size of the infrared camera, and thus, the cost can be reduced, the imaging angle and imaging quality of the infrared camera are better, the photo of the entire eye of the user can be obtained, the phenomenon of blind spots of photographing is avoided, and the accuracy of the eye tracking is improved.

Figure 2:
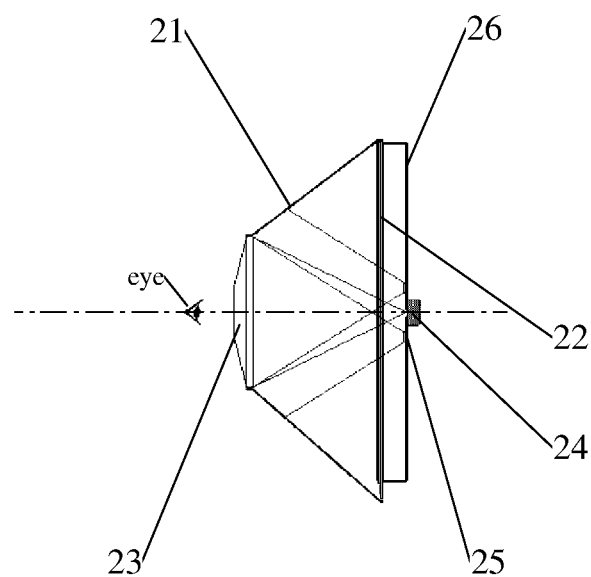
FIG. 2 is a schematic diagram of a specific embodiment of a virtual reality display device provided by some embodiments of the present disclosure.
Figure 3:
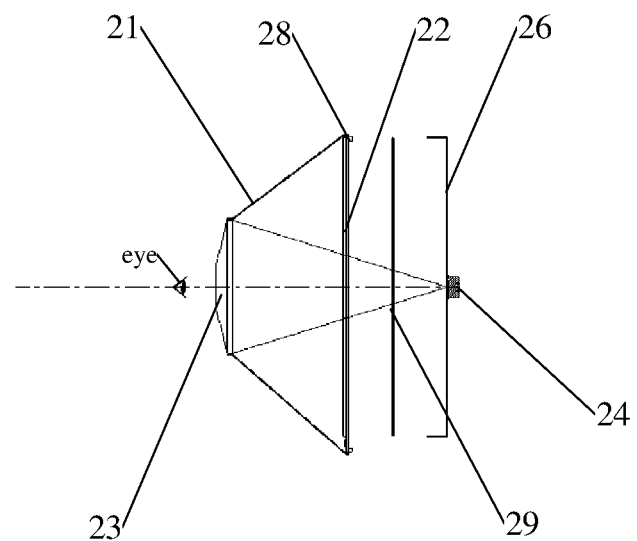
FIG. 3 is an exploded schematic diagram of the virtual reality display device illustrated in FIG. 2.

An embodiment of the present disclosure provides a specific embodiment of a virtual reality display device. As illustrated in FIG. 2 and FIG. 3, the virtual reality display device comprises a display screen 22 configured to display a picture (an image or a video) to a user, an infrared camera 24 is provided on a side of the display screen 22 away from the eye of the user (e.g., a back side opposite to a display side), and the virtual reality display device is further provided with at least one infrared light source 25 for emitting infrared light to illuminate the eye of the user. For example, the display screen 22 can transmit the infrared light. For example, the infrared camera 24 can acquire an eye image of the eye of the user that is illuminated by the at least one infrared light source 25. The infrared camera 24 is on a side of the display screen 22 of the display device away from the eye of the user. In a case where the user normally watches the image displayed on the display screen 22, the user cannot see the infrared camera 24 which is behind the display screen 22, so that the flexibility of the setting position of the infrared camera 24 is increased, and the infrared camera 24 can be disposed close to the visual axis of the user, thereby effectively reducing the requirements for the viewing angle and the size of the infrared camera 24, and for example, the field of view (FOV) of the lens of the infrared camera 24 can be reduced to be less than 30°, thereby reducing the cost of the infrared camera 24. In addition, the angle between the infrared camera 24 and the visual axis of the user becomes smaller, which can improve the image quality of the image of the user's eye, reduce the image distortion, eliminate the blind spots of photographing, and improve the calculation accuracy in the eye tracking process.

For example, the infrared light emitted by the infrared light source 25 may be near-infrared light, mid-infrared light, or far-infrared light, and accordingly, the infrared camera 24 can be configured to acquire near-infrared light, mid-infrared light, or far-infrared light corresponding to the infrared light emitted by the infrared light source 25, and to image based on the infrared light which is acquired. For example, in at least one example, the infrared light source 25 emits infrared light with a predetermined wavelength (or a range of wavelengths), while the infrared camera 24 images only based on the infrared light with the predetermined wavelength (or the range of wavelengths).

In an alternative implementation, the display screen 22 can be fixed to a lens tube 21, the display screen 22 is disposed at an end of the lens tube 21 away from the eye of the user, a lens 23 is disposed at an end of the lens tube 21 close to the eye of the user, and the picture displayed on the display screen 22 can be imaged, by the lens 23, on the eye of the user, so that the user can normally view the picture displayed on the display screen 22. In actual applications, the display screen 22 can also be fixed in other manners, and is not limited to the above manner. For example, the lens 23 may be a general spherical mirror or an aspheric mirror, or may also be other types of optical components, and the embodiments of the present disclosure are not limited thereto. For example, the lens 23 can also be a micro-lens array which has the advantages of small size, light weight, high integration, and the like.

In an alternative implementation, the device may further comprise a support plate 26 on a side of the display screen 22 away from the eye of the user, and a size of the support plate 25 corresponds, for example, to a size of the display screen 22 (for example, the size of the support plate 25 is equal to the size of the display screen 22). The support plate 25 can be configured to provide support for the display screen 22, have a function of shielding external light, and prevent the external light from entering the display screen 22 to affect the normal display of the display screen 22. Certainly, the embodiments of the present disclosure are not limited thereto, and the size of the support plate 25 may also be larger or smaller than the size of the display screen 22, which can be determined according to actual needs.

The infrared camera 24 can be further fixed to the support plate 26, a side of the infrared camera 24 for acquiring images (i.e., a photographing side) is exposed to a side of the support plate 26 close to the display screen 22, so that the infrared camera 24 can take an eye image of the eye of the user that is illuminated by the infrared light. For example, the support plate 26 may be a plate-like structure, a frame structure, or a strip-like structure. In a case where the virtual reality display device further comprises other structures for shielding the external light (for example, a housing of the device, or the like), the structural form of the support plate 26 is not limited as long as the infrared camera 24 can be fixed.

For example, in this embodiment, the support plate 26 comprises a central hollow opening 27, the infrared camera 24 can be fixed on an external side of the support plate 26 away from the eye of the user, and the side of the infrared camera 24 for acquiring images is exposed from the central hollow opening 27. In other alternative implementations, under the conditions permitted by the structure of the display device, the infrared camera 24 can also be entirely fixed to the side of the support plate 26 close to the display screen 22.

Figure 4:
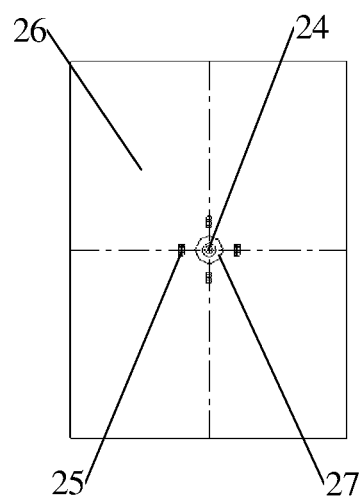
FIG. 4 is a schematic diagram of a support plate of the virtual reality display device illustrated in FIG. 2.

As illustrated in FIG. 4, the infrared camera 24 can be fixed to a position of the support plate 26 corresponding to a center of the display screen 22, that is, for example, the display screen 22 has a plurality of symmetry axes, and the infrared camera 24 is disposed, on the support plate 26, at a position that overlaps with or is adjacent to an intersection of the plurality of symmetry axes, and for another example, the infrared camera 24 is disposed, on the support plate 26, at a position that overlaps with or is adjacent to the visual axis of the user. For example, in a case where the infrared camera 24 is disposed in the central hollow opening 27, the central hollow opening 27 also corresponds to the position of the center of the display screen 22. For example, the infrared camera 24 can coincide with the visual axis of the user, so that the infrared camera 24 can have good imaging quality, thereby reducing distortion of the acquired eye image and eliminating the blind spots of photographing. Certainly, the embodiments of the present disclosure are not limited thereto, and the infrared camera 24 may also have a certain angle with the visual axis of the user, so as to reduce the requirement for the installation accuracy of the infrared camera 24 and to be convenient for manufacturing and processing.

In an alternative implementation, the at least one infrared light source 25 may be disposed on the support plate 26 and evenly distributed around the infrared camera 24. Referring to FIG. 4, in this embodiment, four infrared light sources 25 are distributed around the infrared camera 24, and the infrared light source 25 may be an infrared light emitting device or component that can emit infrared light, such as an infrared light emitting diode, an infrared light emitting transistor, or the like. For example, the count of the infrared light sources 25 is not limited to four, and may be any other number, for example, may be determined according to the intensity of the infrared light required, and the embodiments of the present disclosure are not limited thereto. In other alternative implementations, the at least one infrared light source 25 may also be disposed at an end of the lens tube 21 close to the eye of the user, as long as the infrared light source 25 can emit infrared light to illuminate the eye of the user, and the embodiments of the present disclosure do not limit the position where the infrared light source 25 is disposed.

In an alternative implementation, at least one visible light source 28 can be disposed on the display screen 22, and the visible light source 28 is configured to provide backlight to the display screen 22. For example, in a case where the visible light source 28 is provided, the display screen 22 can be a liquid crystal display screen, and the visible light source 28 can be used as a backlight source to enable the display screen 22 to perform displaying. For example, in some other embodiments, the device may also be provided without the visible light source 28, and in this case, the display screen 22 may be an organic light emitting diode (OLED) display screen, a quantum dot light emitting diode (QLED) display screen, or other suitable display screens. It should be noted that, in the embodiments of the present disclosure, in order to allow the infrared light reflected by the eye of the user to be transmitted through the display screen 22 and to illuminate the infrared camera 24 for imaging, the display screen 22 is configured to transmit the infrared light. For example, the display screen 22 may be a transparent display screen. For example, at least part of the display screen 22 may also be set to be transparent, and for example, an area between sub-pixels of the display screen 22 is set to be a transparent structure, thereby being capable of transmitting the infrared light.

Referring to FIG. 3, in this embodiment, one visible light source 28 is disposed on an edge of a surface on a side of the display screen 22 close to the support plate 26, and furthermore, a transflective film 29 is provided between the visible light source 28 and the support plate 26, and the transflective film 29 is configured to transmit infrared light and reflect visible light. The transflective film 29 can reflect the visible light, and after being reflected by the transflective film 29, the visible light emitted by the visible light source 28 can serve as backlight for the display screen 22. Meanwhile, the transflective film 29 can transmit the infrared light, the infrared light emitted by the infrared light source 25 disposed on the support plate 26 can pass through the transflective film 29 and can illuminate the user's eye, and the infrared light reflected by the user's eye can pass through the transflective film 29 to reach the infrared camera 24, so as to form the eye image. For example, the transflective film 29 is disposed on a surface on a side of the support plate 26 close to the display screen 22. For example, the transflective film 29 can be obtained by processing an infrared light sensitive material by a coating method. For example, the transflective film 29 may be a CAMO film of Minnesota Mining and Manufacturing Company (3M Company). It should be noted that, in the embodiments of the present disclosure, the transflective film 29 can be prepared by using any suitable materials, so long as the transflective film 29 can transmit the infrared light and reflect the visible light. Regarding the specific characteristics of the transflective film 29, reference may be made to the conventional design, and the details are not described herein.

Figure 5:
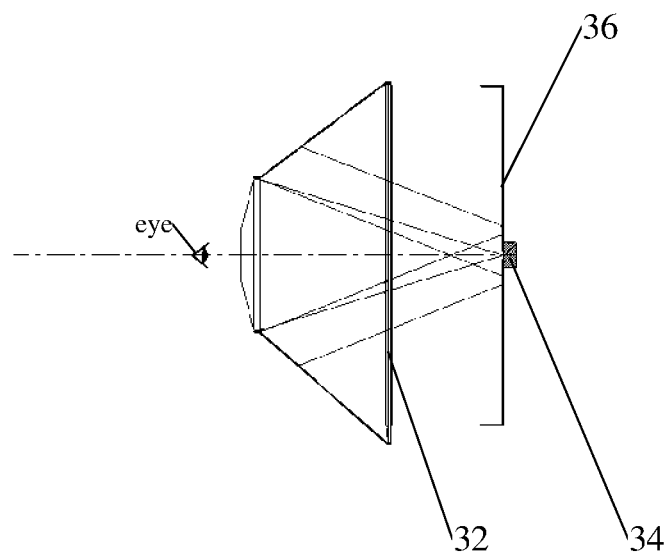
FIG. 5 is an exploded schematic diagram of another specific embodiment of a virtual reality display device provided by some embodiments of the present disclosure.
Figure 6:
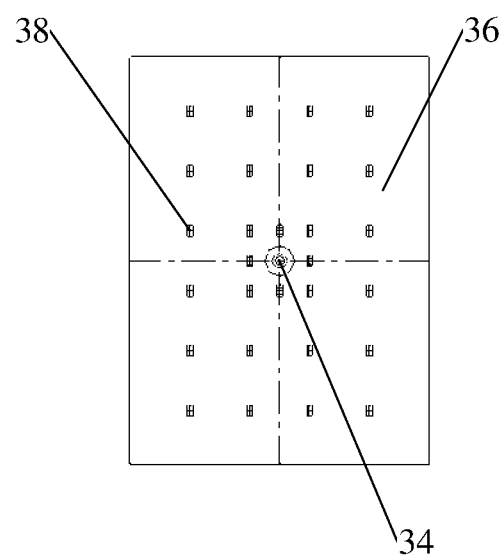
FIG. 6 is a schematic diagram of a support plate of the virtual reality display device illustrated in FIG. 5.

In another embodiment, as illustrated in FIG. 5 and FIG. 6, at least one visible light source 38 is fixed to a side of the support plate 36 close to the display screen 32, and for example, the visible light sources 38 can be arranged in an array to provide uniform backlight. By using the visible light sources 38 which are arranged in the array and disposed on the support plate 36 to provide backlight for the display screen 32, the conventional side light source is replaced with a surface light source, there is no need to provide a reflective film that reflects visible light of the side light source to change the light path of the side light source to provide backlight, and the infrared light can also be transmitted through the display screen 32 to reach the infrared camera 34, so that the infrared camera 34 can acquire the eye image of the eye of the user without the need to provide a transflective film, the structure is simple, and the cost is low. In this embodiment, in a case where stray light (a wavelength is in the visible wavelength range) is incident on the infrared camera 34, because the infrared camera 34 is only sensitive to the infrared light, imaging of the infrared camera 34 is not affected.

Figure 7:
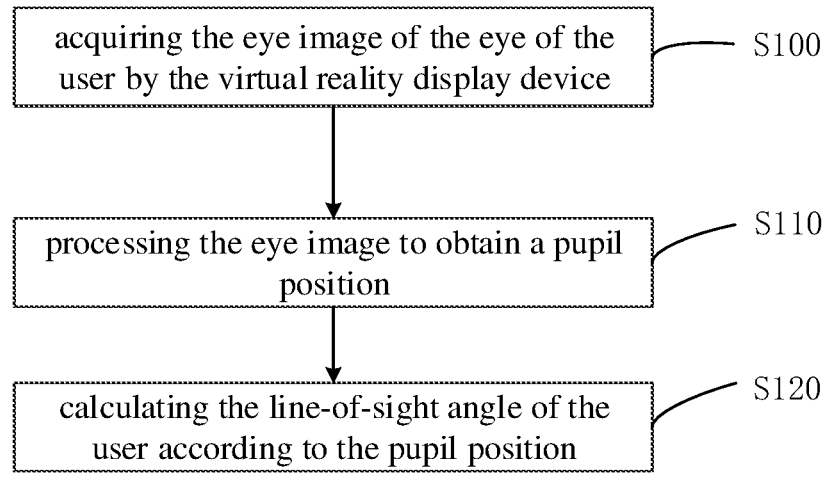
FIG. 7 is a flow chart of a specific embodiment of a calculation method of a line-of-sight angle provided by some embodiments of the present disclosure.

As illustrated in FIG. 7, an embodiment of the present disclosure further provides a specific embodiment of a calculation method of a line-of-sight angle, and a method 10 comprises following operations.

Step S100: acquiring the eye image of the eye of the user by the virtual reality display device as described above. For example, at least one infrared light source can be controlled to be turned on, and the infrared camera is controlled to acquire the eye image of the eye of the user that is illuminated by the at least one infrared light source.

Step S110: processing the eye image to obtain a pupil position. For example, the pupil of the eye may form an infrared bright spot under the illumination of the infrared light, the eye image of the eye of the user acquired by the infrared camera can be obtained, and the eye image can be processed to obtain the pupil position of the eye on the eye image. For example, a conventional image recognition algorithm can be adopted to identify the pupil in the eye image to obtain the pupil position.

Step S120: calculating the line-of-sight angle of the user according to the pupil position. For example, the line-of-sight angle of the user at this time can be calculated according to a preset and corresponding mapping relationship between each position on the eye image and the line-of-sight angle of the user, as well as the pupil position.

The technical effect of the calculation method of the line-of-sight angle can be referred to the foregoing content, and details are not described herein again. The calculation method of the line-of-sight angle may further comprise more steps, and the order of performing the respective steps is not limited and can be determined according to actual needs.

Figure 9:
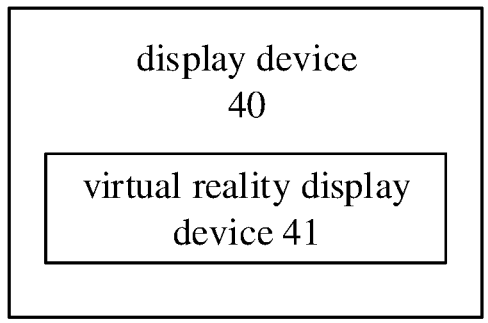
FIG. 9 is a schematic block diagram of a display device provided by some embodiments of the present disclosure.

An embodiment of the present disclosure further provides a display device, which comprises the virtual reality display device according to any one of the embodiments of the present disclosure. For example, as illustrated in FIG. 9, a display device 40 comprises a virtual reality display device 41, and the virtual reality display device 41 may be the virtual reality display device described in any one of the embodiments of the present disclosure. The display device 40 can be a virtual reality display device such as a VR helmet or VR glasses. The technical effect of the display device 40 can be referred to the foregoing content, and details are not described herein again.

In an alternative embodiment, the display device can further comprise a processor, a memory, and a computer program (one or more computer program modules) which is stored on the memory and can be executed by the processor. The following method can be implemented when the one or more computer program modules are executed by the processor, and the method comprises: acquiring, by the virtual reality display device 41, the eye image of the eye of the user that is illuminated by the at least one infrared light source; processing the eye image to obtain a pupil position on the eye image; and calculating a line-of-sight angle of the user according to the pupil position. For example, the calculation method of the line-of-sight angle as described above can be implemented when the one or more computer program modules are executed by the processor.

By disposing the infrared camera on the back side of the display screen, the components disposed at a side of the display device close to the eye are reduced. The infrared camera can be connected to the processor via a flexible printed circuit (FPC), and the distance between the infrared camera, located on the back side of the display screen, and the processor is shortened. On one hand, a length of the FPC for data connection is shortened, and on the other hand, a transmission distance of the eye image acquired by the infrared camera is also shortened, thereby reducing the loss of the image signal during the transmission process and improving the image quality acquired by the processor, so that the eye tracking and the line-of-sight angle calculation of the user are more accurate.

In other alternative implementations, the display device can also be in signal connection with an external computer device, and can establish a signal connection relationship with the external computer device in a wired or wireless way. For example, the computer device can comprise a processor, a memory, and a computer program which is stored on the memory and can be executed by the processor, and the calculation method of the line-of-sight angle 10 as described above can be implemented when the processor executes the program.

Figure 8:
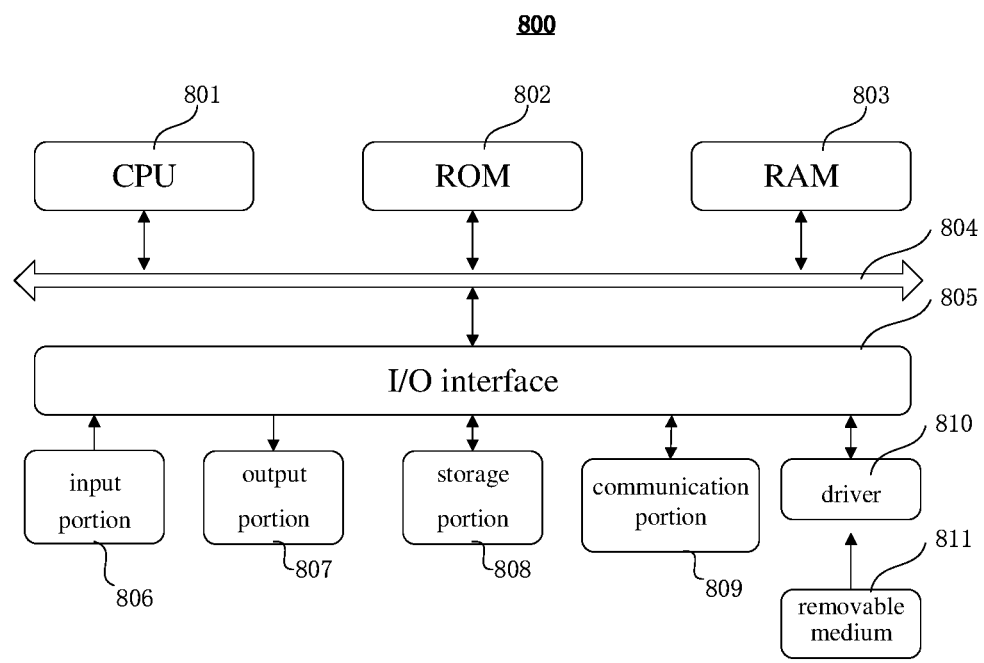
FIG. 8 is a structural schematic diagram of a computer device suitable for implementing a calculation method of a line-of-sight angle provided by some embodiments of the present disclosure.

Referring to FIG. 8, FIG. 8 is a structural schematic diagram of a computer device 800. As illustrated in FIG. 8, the computer device 800 comprises a central processing unit (CPU) 801 that can perform various appropriate operations and processes according to a program stored in a read only memory (ROM) 802 or a program loaded from a storage portion 808 into a random access memory (RAM) 803. Various programs and data required for the operations of the computer device 800 are also stored in the RAM 803. For example, the CPU 801 may be the processor described in the above embodiment, and the ROM 802 may be the memory described in the above embodiment. The CPU 801, the ROM 802, and the RAM 803 are connected to each other in signal via a bus 804. An input/output (I/O) interface 805 is also in signal connection with the bus 804.

For example, the computer device 800 also comprises a plurality of external devices, and the plurality of external devices are connected to the I/O interface 805. For example, these external devices comprise: an input portion 806 comprising a keyboard, a mouse, and the like; an output portion 807 comprising a cathode ray tube (CRT), a liquid crystal display (LCD), a speaker, and the like; a storage portion 808 comprising a hard disk and the like; and a communication portion 809 comprising a network interface card such as a LAN card, a modem, and the like. The communication portion 809 performs communication processing via a network such as the Internet. A driver 810 is also connected to the I/O interface 806 as needed. A removable medium 811, such as a magnetic disk, an optical disk, a magneto-optical disk, a semiconductor memory, or the like, is mounted on the driver 810 as needed, so that a computer program that can be read out from the removable medium 811 can be installed on the storage portion 808 as needed.

According to the embodiments of the present disclosure, the processes described above with reference to the flow chart can be implemented as a computer software program. For example, an embodiment of the present disclosure provides a computer program product which comprises a computer program tangibly included in a machine readable medium, and the computer program comprises program codes for performing the method illustrated in the flow chart. In this embodiment, the computer program can be downloaded from the network via the communication portion 809 and be installed, and/or be installed from the removable medium 811.

The flow charts and block diagrams in the accompanying drawings illustrate the architectures, functions, and operations, which can be achieved by systems, methods, and computer program products according to various embodiments of the present disclosure. In this regard, each block of the flow charts or block diagrams can represent a module, a program segment, or a portion of codes, and the module, the program segment, or the portion of codes comprises one or more executable instructions for implementing the specified logical functions. It should also be noted that, in some alternative implementations, the functions marked in the blocks may also be transmitted in an order different from an order marked in the drawings. For example, two successively represented blocks may, in fact, be executed substantially in parallel, and can sometimes be executed in a reverse order, which depends on the function involved. It should also be noted that, each block in the block diagrams and/or flow charts and a combination of blocks in the block diagrams and/or flow charts can be implemented by a special hardware-based system that performs the specified functions or operations, or may be implemented in a combination of a dedicated hardware and computer instructions.

Apparently, the above-described embodiments of the present disclosure are merely illustrative examples for describing the present disclosure clearly, and are not intended to limit the implementations of the present disclosure. Other different variations or modifications may be made by those skilled in the art based on the above description, it is not possible to exhaust all implementations here, and obvious changes or variations that are extended from the technical scheme of the present disclosure are still within the protection scope of the present disclosure.

What is claimed is:

1. A virtual reality display device, comprising: a display screen configured to display a picture to a user, at least one infrared light source, and an infrared camera,
   wherein the infrared camera is on a side of the display screen away from an eye of the user, and is configured to acquire an eye image of the eye of the user that is illuminated by the at least one infrared light source;
   the virtual reality display device further comprises a support plate on the side of the display screen away from the eye of the user,
   wherein the infrared camera is fixed to the support plate;
   the virtual reality display device further comprises at least one visible light source located on an edge of a surface on a side of the display screen close to the support plate, wherein the at least one visible light source is configured to provide backlight to the display screen; and the virtual reality display device further comprises a transflective film, wherein the transflective film is between the at least one visible light source and the support plate, and the transflective film transmits infrared light and reflect visible light.

2. The virtual reality display device according to claim 1, wherein the support plate comprises a central hollow opening, and the infrared camera is in the central hollow opening.

3. The virtual reality display device according to claim 1, further comprising at least one visible light source fixed to a side of the support plate close to the display screen, wherein the at least one visible light source is configured to provide backlight to the display screen.

4. The virtual reality display device according to claim 3, wherein the at least one visible light source comprises a plurality of visible light sources, and the plurality of visible light sources are arranged in an array on the support plate.

5. The virtual reality display device according to claim 1, wherein the transflective film is on a surface on a side of the support plate close to the display screen.

6. The virtual reality display device according to claim 1, wherein the at least one infrared light source is on a side of the support plate close to the display screen.

7. The virtual reality display device according to claim 6, wherein the at least one infrared light source comprises four infrared light sources, and the four infrared light sources are distributed around the infrared camera.

8. The virtual reality display device according to claim 7, wherein the four infrared light sources are evenly distributed around the infrared camera.

9. The virtual reality display device according to claim 1, wherein the display screen has a plurality of symmetry axes, and the infrared camera is, on the support plate, at a position which overlaps with an intersection of the plurality of symmetry axes.

10. The virtual reality display device according to claim 1, further comprising a lens tube, wherein the display screen is at an end of the lens tube away from the eye of the user.

11. The virtual reality display device according to claim 10, wherein an end of the lens tube close to the eye of the user is provided with the at least one infrared light source.

12. The virtual reality display device according to claim 10, further comprising a lens, wherein the lens is at an end of the lens tube close to the eye of the user, and is configured to image the picture displayed by the display screen.

13. The virtual reality display device according to claim 12, wherein the lens comprises a micro-lens array.

14. The virtual reality display device according to claim 1, wherein the display screen is capable of transmitting infrared light emitted by the at least one infrared light source.

15. A calculation method of a line-of-sight angle, comprising:

acquiring, by the virtual reality display device according to claim 1, the eye image of the eye of the user that is illuminated by the at least one infrared light source;

processing the eye image to obtain a pupil position on the eye image; and calculating the line-of-sight angle of the user according to the pupil position.

16. A display device, comprising the virtual reality display device according to claim 1.

17. The display device according to claim 16, further comprising a processor and a memory, wherein the memory comprises one or more computer program modules, the one or more computer program modules are stored in the memory and configured to be executed by the processor, and the one or more computer program modules are executed by the processor to perform:

acquiring, by the virtual reality display device, the eye image of the eye of the user that is illuminated by the at least one infrared light source;

processing the eye image to obtain a pupil position on the eye image; and calculating a line-of-sight angle of the user according to the pupil position.

\* \* \* \* \*